United States Patent
Bruin-Slot et al.

(10) Patent No.: US 9,897,330 B2
(45) Date of Patent: Feb. 20, 2018

(54) SYSTEM AND METHOD FOR MOUNTING UNDERCABINET VENTILATION HOOD

(71) Applicant: Whirlpool Corporation, Benton Harbor, MI (US)

(72) Inventors: Zachary J. Bruin-Slot, Baroda, MI (US); Andrew James Grose, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 962 days.

(21) Appl. No.: 13/904,258

(22) Filed: May 29, 2013

(65) Prior Publication Data

US 2014/0352132 A1    Dec. 4, 2014

(51) Int. Cl.
A47B 77/08    (2006.01)
F24C 15/20    (2006.01)
(Continued)

(52) U.S. Cl.
CPC .......... F24C 15/2071 (2013.01); A47B 77/08 (2013.01); F24F 13/0254 (2013.01); B23P 19/10 (2013.01); F24C 15/205 (2013.01); F24C 15/2035 (2013.01); F24C 15/2042 (2013.01); Y10T 29/49623 (2015.01); Y10T 29/49826 (2015.01); Y10T 29/49948 (2015.01); Y10T 29/53 (2015.01)

(58) Field of Classification Search
CPC .. A47B 77/08; F24F 13/0254; F24C 15/2035; F24C 15/205; F24C 15/2042; F24C 15/2071; Y10T 29/53; Y10T 29/49826; Y10T 29/49948; Y10T 29/49623

USPC ...................... 29/525.01, 525.02, 700, 897.3
See application file for complete search history.

(56) References Cited

U.S. PATENT DOCUMENTS 510,510 A * 12/1893 Johnson .................. F16B 39/32
                                                    411/206
1,467,781 A *  9/1923 Dawson .................. B42F 13/12
                                                    411/338
(Continued)

FOREIGN PATENT DOCUMENTS

CN       1888577       1/2007
DE       7530601       1/1976
(Continued)

OTHER PUBLICATIONS

DE 3417453 EPO English Machine Translation, Baumgartl et al.; Oct. 20, 2015; pp. 1-2.*

*Primary Examiner* — Christopher Besler
*Assistant Examiner* — Bayan Salone
(74) *Attorney, Agent, or Firm* — Diederiks & Whitelaw, PLC

(57) ABSTRACT

A ventilation hood is mounted to an underside of a cabinet, including a bottom panel and a lower support frame positioned above a cooking appliance, by first and second brackets secured below the cabinet at spaced positions aligned with outermost edge portions of the lower support frame and at least one fastener assembly secured to a front portion of the ventilation hood. Multiple embodiments are disclosed for the at least one fastener assembly, including tabs bent from a housing of the ventilation hood, feet threadably attached to the hood, mounting blocks including snap connectors, threaded fasteners, and pinned bolts.

26 Claims, 13 Drawing Sheets

(51) Int. Cl.
  *F24F 13/02* (2006.01)
  *B23P 19/10* (2006.01)

(56) References Cited

U.S. PATENT DOCUMENTS

| | | | | |
|---|---|---|---|---|
| 2,349,541 A * | 5/1944 | Guyon | A47B 77/08 | 126/299 R |
| 2,839,987 A * | 6/1958 | Pryne | F24C 15/20 | 126/299 D |
| 2,887,351 A | 5/1959 | Allender | | |
| 2,946,612 A * | 7/1960 | Ahlgren | E05C 19/066 | 24/662 |
| 2,971,451 A * | 2/1961 | Feig | F24C 15/20 | 126/299 D |
| 3,125,869 A * | 3/1964 | Winton | B08B 15/02 | 126/299 D |
| 3,372,632 A * | 3/1968 | Stalker | F24C 15/2071 | 126/299 D |
| 3,551,963 A * | 1/1971 | Long et al. | A44B 17/0029 | 24/618 |
| 3,749,465 A * | 7/1973 | Newcomer | A47B 47/00 | 312/245 |
| 3,768,064 A * | 10/1973 | Pabich | H04N 5/64 | 24/701 |
| 3,908,328 A * | 9/1975 | Nelsson | E04B 2/825 | 29/897.3 |
| 4,011,803 A * | 3/1977 | Pfaffinger | A47B 77/08 | 126/299 R |
| 4,050,184 A * | 9/1977 | Chiari | A63H 33/101 | 273/157 R |
| 4,154,343 A | 5/1979 | Lautenschlager et al. | | |
| 4,397,577 A * | 8/1983 | Bauer | B42F 1/02 | 24/545 |
| 4,437,712 A * | 3/1984 | Wissinger | A47B 67/005 | 312/209 |
| 4,448,327 A * | 5/1984 | Gahm | B65D 43/165 | 220/840 |
| 4,453,690 A * | 6/1984 | Takeuji | F24C 15/2071 | 248/309.1 |
| 4,465,256 A * | 8/1984 | Wolbrink | F24C 15/2071 | 248/201 |
| 4,576,355 A * | 3/1986 | Graf | A47B 95/008 | 248/223.41 |
| 4,580,853 A * | 4/1986 | Hitzeroth | F24C 15/30 | 248/317 |
| 4,614,177 A | 9/1986 | Buckley et al. | | |
| 4,628,185 A * | 12/1986 | Norwood | A47J 37/0623 | 219/386 |
| 4,629,185 A * | 12/1986 | Amann | A63B 21/0083 | 482/113 |
| 4,630,532 A * | 12/1986 | Sonnentag | A47J 31/0573 | 248/201 |
| 4,666,113 A * | 5/1987 | Itoh | H05B 6/642 | 219/756 |
| 4,753,406 A * | 6/1988 | Kodama | A47B 77/02 | 248/327 |
| 4,775,273 A * | 10/1988 | Bauer | F16B 2/205 | 403/377 |
| 4,792,195 A * | 12/1988 | Adriaansen | A47B 88/0407 | 248/201 |
| 4,796,850 A * | 1/1989 | Aramaki | F24C 15/30 | 248/309.1 |
| 4,824,061 A * | 4/1989 | Sumikama | F24C 15/2042 | 248/225.21 |
| 5,131,711 A * | 7/1992 | Laferle | B60J 3/0278 | 24/662 |
| 5,207,543 A * | 5/1993 | Kirma | F16B 39/08 | 411/121 |
| 5,207,546 A * | 5/1993 | Bouverie | F16B 21/08 | 24/453 |
| 5,274,973 A * | 1/1994 | Liang | E04B 2/58 | 52/243 |
| 5,333,827 A * | 8/1994 | Gioscia | A47B 81/065 | 248/289.11 |
| 5,638,838 A * | 6/1997 | Lombardi | A45C 13/005 | 132/294 |
| 5,774,319 A * | 6/1998 | Carter | H02H 1/06 | 361/100 |
| 5,887,388 A * | 3/1999 | Hempel | F24B 1/198 | 126/278 |
| 6,003,212 A * | 12/1999 | Imahata | A43C 11/00 | 24/324 |
| 6,209,268 B1 * | 4/2001 | Schmidt | E04B 1/2608 | 52/665 |
| 6,222,171 B1 * | 4/2001 | Fukuda | A47B 77/08 | 219/702 |
| 6,341,754 B1 * | 1/2002 | Melito | A47B 77/08 | 248/201 |
| 6,382,867 B2 * | 5/2002 | Serre | B29C 65/58 | 24/662 |
| 6,430,881 B1 * | 8/2002 | Daudet | E04B 7/045 | 52/696 |
| 6,444,954 B1 | 9/2002 | Blankenship | | |
| 6,510,619 B2 * | 1/2003 | Mills | B44C 7/02 | 33/563 |
| 7,129,452 B2 * | 10/2006 | Cho | H05B 6/6429 | 126/273 A |
| 7,222,925 B2 * | 5/2007 | Yu | F16M 13/02 | 312/223.1 |
| 7,240,459 B2 * | 7/2007 | Daudet | E04B 5/10 | 52/264 |
| 7,654,258 B2 * | 2/2010 | Negandhi | F24C 15/20 | 126/299 D |
| 7,780,128 B2 * | 8/2010 | Walsberg | A47B 91/024 | 248/188.2 |
| 8,079,652 B2 * | 12/2011 | Laible | A47B 77/08 | 312/140.1 |
| 8,182,051 B2 * | 5/2012 | Laible | A47B 77/08 | 312/111 |
| 8,272,377 B2 * | 9/2012 | Tsakiris | F24C 15/2071 | 126/299 D |
| 2005/0246989 A1 * | 11/2005 | Pringle | E04F 13/142 | 52/384 |
| 2006/0042622 A1 * | 3/2006 | Searer | F24C 15/2071 | 126/299 R |
| 2007/0256681 A1 * | 11/2007 | Chiang | F24C 15/2071 | 126/299 R |
| 2008/0175656 A1 * | 7/2008 | Blattner | A63H 33/102 | 403/292 |
| 2008/0184538 A1 * | 8/2008 | Shellnutt | A44B 99/00 | 24/326 |
| 2008/0302352 A1 * | 12/2008 | Pearce | F24C 15/2071 | 126/299 R |
| 2009/0103999 A1 * | 4/2009 | Fucito | F16B 13/0808 | 411/342 |
| 2009/0165268 A1 * | 7/2009 | Laible | A47B 77/08 | 24/589.1 |
| 2009/0267468 A1 * | 10/2009 | Laible | A47B 77/08 | 312/237 |
| 2014/0352151 A1 * | 12/2014 | Bruin-Slot | F24C 15/2071 | 29/897.3 |
| 2015/0047198 A1 * | 2/2015 | Bruin-Slot | F24C 15/2071 | 29/897.3 |

FOREIGN PATENT DOCUMENTS

| | | | | |
|---|---|---|---|---|
| DE | 7530601 U * | 1/1976 | | F24C 15/2071 |
| DE | 34 17 453 | 11/1985 | | |
| DE | 3417453 A1 * | 11/1985 | | F24C 15/2071 |
| DE | 202012008040 | 9/2012 | | |
| DE | 102011051104 | 11/2012 | | |
| EP | 1621819 | 2/2006 | | |
| EP | 1621819 A2 * | 2/2006 | | F24C 15/20 |
| EP | 1939538 | 7/2008 | | |
| EP | 1939538 A2 * | 7/2008 | | F24C 15/2071 |
| EP | 2229846 A1 | 9/2010 | | |
| EP | 2546578 | 1/2013 | | |
| FR | 2766112 | 1/1999 | | |

(56) References Cited

FOREIGN PATENT DOCUMENTS

| | | | | |
|---|---|---|---|---|
| FR | 2766112 A1 * | 1/1999 | ............ | B08B 15/02 |
| JP | 4897234 | 11/1973 | | |
| JP | 02126038 | 5/1990 | | |
| JP | 02126038 A * | 5/1990 | | |
| JP | 1151436 | 2/1999 | | |
| JP | 2006153395 | 6/2006 | | |
| JP | 2006153395 A * | 6/2006 | | |
| JP | 2006234361 A * | 9/2006 | | |

* cited by examiner

SYSTEM AND METHOD FOR MOUNTING UNDERCABINET VENTILATION HOOD

BACKGROUND OF THE INVENTION

Field of the Invention

The present invention pertains to the art of cooking and, more particularly, to a system and method for mounting a ventilation hood under cabinetry positioned above a cooking appliance.

Description of the Related Art

In the art of cooking, numerous types of cooking appliances are known, including both slide-in and drop-in ranges. Basically, both types of ranges are designed to be situated in a space or cut-out provided along a length of a kitchen countertop. In either case, the range includes at least one oven cavity supported below a cooktop. Of course, it is also known to separately mount cooktops, without lower oven cavities, in countertops. In any case, when the cooktop is utilized for cooking operations, a certain degree of smoke, grease or the like can be created. To counter the airborne nature of these byproducts, it is known to mount a ventilation unit above the range. Basically, such known ventilation units include an exhaust fan which functions to draw the smoke and other byproducts away from the cooktop. The byproducts are typically either directed to a vent external of the cooking area or filtered such that the cleansed air is simply expelled back into the cooking area. Such known ventilation units can take the form of a ventilation hood or can be incorporated into an overhead microwave oven mounted above the range. In many situations, the ventilation unit will also incorporate a light to aid in illuminating the cooktop.

In mounting a ventilation unit incorporated into a microwave oven to the bottom of a cabinet which is centered above and spans the appliance, it is commonplace to bolt the ventilation unit to a bottom cabinet panel. More specifically, a housing of the microwave oven is provided with spaced front and rear mounting holes and a template can be provided which enables an installer to mark drilling locations in the bottom panel of the cabinet, with the intent that the drilled holes will be aligned with pre-formed mounting holes in the unit. Assuming the proper alignment exists, the microwave oven can be held in a position beneath the upper cabinet and bolts inserted through each of the aligned hole sets to secure the microwave oven in place. In the case of a ventilation hood, the housing of the hood is typically used as a template for determining appropriate fastener locations and then filler strips are measured, cut and installed beneath the cabinet to complete lower framing needed to mount the ventilation hood.

Certain problems are considered to exist in each of these overall mounting arrangements. First of all, at least in the case ventilation units incorporated in microwave ovens, it is common for the template to take the form of a folded paper template which must be unfolded, cut to fit the underside of the upper cabinet and taped or otherwise retained in position to establish the drilling locations. Given that creases and improper cuts can contribute to misalignment issues, it is not uncommon for product manufacturers to recommend that significantly larger holes be drilled than needed to receive the bolts, and washers are provided to accommodate the enlarged holes. In this manner, a degree of tolerance is established to better assure potential alignment of each bolt with a designated hole in the ventilation unit. In the case of ventilation hoods, the measuring, cutting and mounting of filler strips can be quite tedious and time consuming, particularly if a professional installer is not employed. In both types of mounting arrangements, a second significant problem is that, after the holes are drilled and it is time to actually secure the ventilation unit, two people are required, one for holding the ventilation unit in place and the other for inserting and tightening at least a couple of the bolts. Certainly, given the confined space and the need to hold the unit around eyelevel for some time, this operation is less than desirable.

Although two people may be necessary for mounting a microwave, it is desired in accordance with the present invention to provide a method which enables a single user to readily install a ventilation hood over a cooking appliance through the use of a simplified and efficient installation system.

SUMMARY OF THE INVENTION

The present invention is directed to a system and method for mounting a ventilation hood above a cooking appliance and under a cabinet, such as in a kitchen. The cabinet incorporates standard structure, including a lower support frame having a downwardly extending rectangular flange extending beyond a bottom panel or floor of the cabinet and terminating at lateral peripheral edges. In accordance with a first aspect, the system includes left and right support brackets mounted to an upstanding wall, against which the cabinet is mounted, at spaced lateral positions aligned with the lateral peripheral edges. Each support bracket includes an upstanding projection or tab which is received in a slot provided in the back of the ventilation hood such that a rear portion of the range hood can be easily supported by a single person while the ventilation hood is being connected to the cabinet.

In accordance with another aspect of the invention, several ways are proposed for separately securing a front portion of the ventilation hood to the cabinet, while accommodating a filler space between the bottom panel of the cabinet and the bottom of the downwardly extending flange. In a first embodiment, flexible tabs are punched out of the top of a housing of the ventilation hood, partially creating enlarged openings in the top of the hood. The flexible tabs are aligned with the downwardly extending flanges of the cabinet and screws are placed upwardly at an angle of approximately 45° through the enlarged openings in the range hood and pre-formed holes in the flexible tabs to fasten the flexible tabs to the flanges. In a second embodiment, feet members are positioned between the bottom panel of the cabinet and the ventilation hood. During installation the feet may be temporarily installed in mounting holes in the ventilation hood and then the hood placed onto the brackets and moved into position under the cabinet. The feet can be selectively extended or retracted relative to the range hood based on the height of the cabinet flange, i.e., the dimension of the filler space between the bottom panel of the cabinet and the lowermost edge of the cabinet support frame. A drill is then used to drill holes through the cabinet floor using the feet as locator or pilot guides. The ventilation hood is temporarily removed from the cabinet and the feet are removed from the hood. Next, one after another, the feet are placed against the bottom panel of the cabinet and screws are installed through the bottom panel and threaded into the feet. Once again, the ventilation hood is placed on the brackets and tilted into a final position under the cabinet, allowing the feet to enter the mounting holes. Either a tool or an installer's fingers can be used to then rotate the feet until the hood is tight against the cabinet.

In another embodiment, specifically configured mounting blocks are provided for mounting to the lower support frame of the cabinet at frontal corner portions. The mounting blocks are dimensioned such that, once mounted against the lower support frame in the filler space, connectors extend downwardly from the mounting blocks. When the ventilation hood is supported on the rear brackets and tilted upwardly, mounting holes in the ventilation hood become aligned with the connectors. In accordance with one arrangement, the connectors snap-connect with the ventilation hood for a secure fit.

Various other embodiments are disclosed which employ the support brackets but which are based on drilling holes in the bottom panel of the cabinet. In one embodiment, first and second fastener elements extend from a common plate which is preconfigured to establish requisite hole locations needed in the floor of the cabinet. After forming the holes, such as through a drilling operation, each of the first and second mechanical fasteners is extended through both the bottom panel and the ventilation hood, while the plate is positioned against the bottom panel. In the case of threaded fastener elements, nuts are secured to fix the ventilation hood in place. Instead of interconnected threaded fasteners, multiple zip strips can be used to mount the ventilation hood. In accordance with this embodiment, during installation an elongated body portion of each zip strip is fed into a respective hole formed in the bottom panel and then retained in place by a retainer element. The ventilation hood is then lifted in place while the zip strips hang down through respective holes in the hood and respective zip washers or fasteners are attached to the zip strips. The ventilation hood is raised in abutment with the underside of the cabinet and the zip fasteners are ratcheted until the hood is tightly mounted to the bottom of the cabinet. The remaining part of the zip strips are then cut off. In still further embodiments, the holes formed in the bottom panel of the cabinet receive bolts having transverse holes for receiving pins, or toggle bolts are employed. In each case, the need for a template is avoided and the rear brackets function to support the ventilation hood so that a single person can hold the ventilation hood as needed during the attachment of the frontal portion of the hood to the cabinet.

Additional objects, features and advantages of the invention will become readily apparent from the following detailed description of preferred embodiments of the invention when taken in conjunction with the drawings wherein like reference numerals refer to corresponding parts in the several views.

DETAILED DESCRIPTION OF PREFERRED EMBODIMENTS

Figure 1:
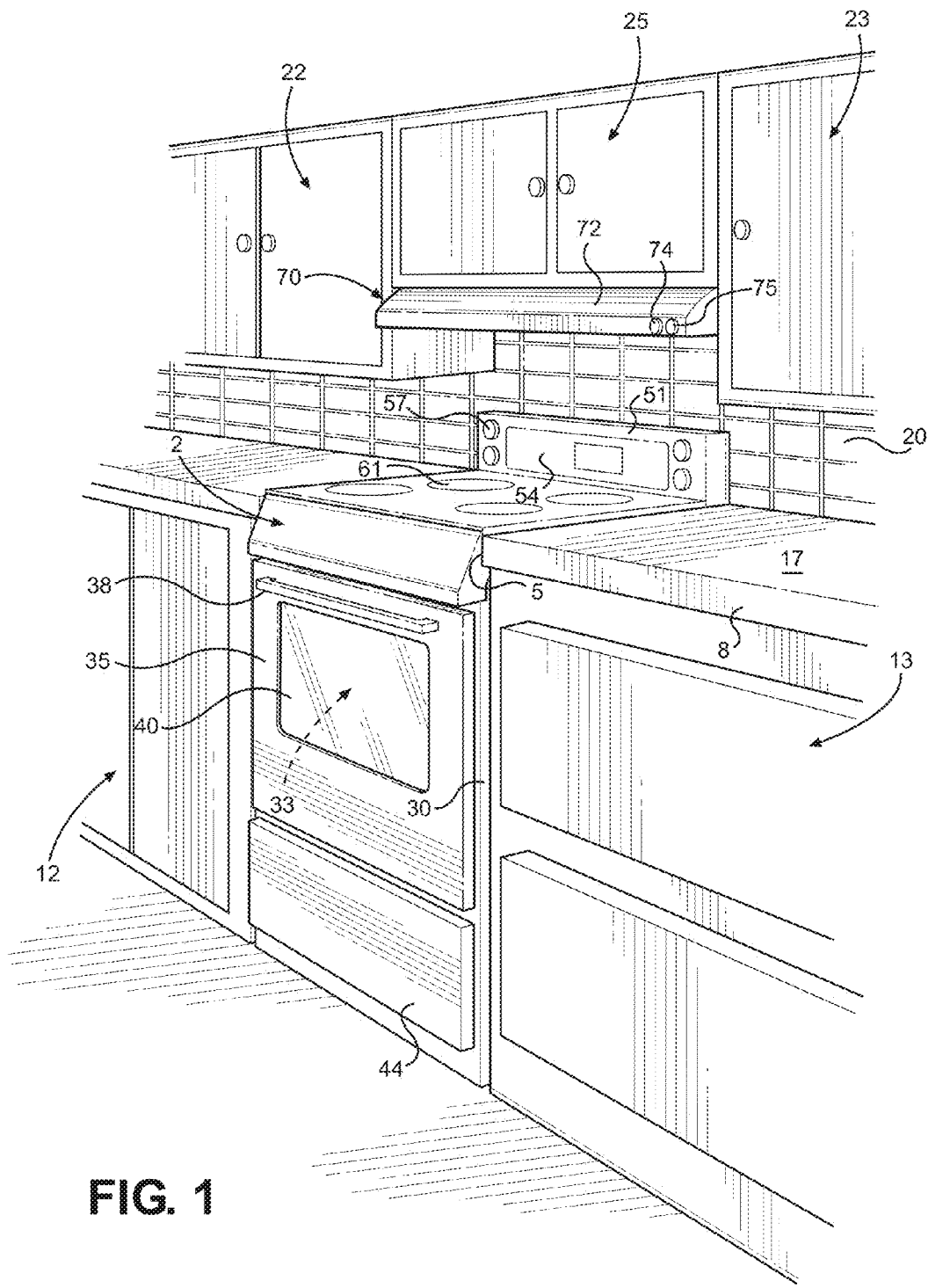
FIG. 1 is a perspective view illustrating a ventilation hood mounted in accordance with the invention to cabinetry positioned above a range in a kitchen environment.

With initial reference to FIG. 1, a cooking appliance 2 is shown positioned in a cut-out or opening 5 provided in a countertop 8 and between adjacent lower cabinetry 12 and 13. Countertop 8 has an upper surface 17 extending to a rear upstanding wall 20. Above countertop 8 are shown wall cabinets 22 and 23 mounted on either side of cooking appliance 2, as well as a central cabinet 25 arranged above a portion of cooking appliance 2 and extending between upstanding rear and side walls 21 and 22 respectively.

Within the scope of the invention, cooking appliance 2 can take on various forms, including all fuel type ranges and built-in cooktops. However, in the exemplary embodiment illustrated, cooking appliance 2 is illustrated as a range including a cabinet or shell 30 which supports an oven cavity 33 located behind a door 35 having a handle 38 and a window 40. In a manner known in the art, door 35 can be pivoted to access oven cavity 33. Also, as shown, cooking appliance 2 includes a lower drawer 44 for use in storing pans and the like. In addition, cooking appliance 2 includes an upper control panel 51 having a central oven control section 54. Furthermore, control panel 51 is shown provided with a plurality of control knobs, one of which is indicated at 57, for regulating operation of upper cooktop heating elements or burners, such as that indicated at 61.

Particularly with the inclusion of the heating elements or burners 61, operation of cooking appliance 2 can produce smoke, grease or other airborne byproducts. To counter the potential detrimental effects of these cooking byproducts, it is desired to mount a ventilation hood 70 above cooking appliance 2, specifically to the underside of central cabinet 25 and between side wall cabinets 22 and 23, to draw in and either exhaust or filter and re-direct the associated flow of air. Certainly, ventilation hoods employed for this purpose is known in the art, but the present invention is particularly directed to a system and method for mounting ventilation hood 70, specifically various mounting arrangements which enable a single installer to readily and efficiently secure ventilation hood 70 to central cabinet 25.

Figure 2:
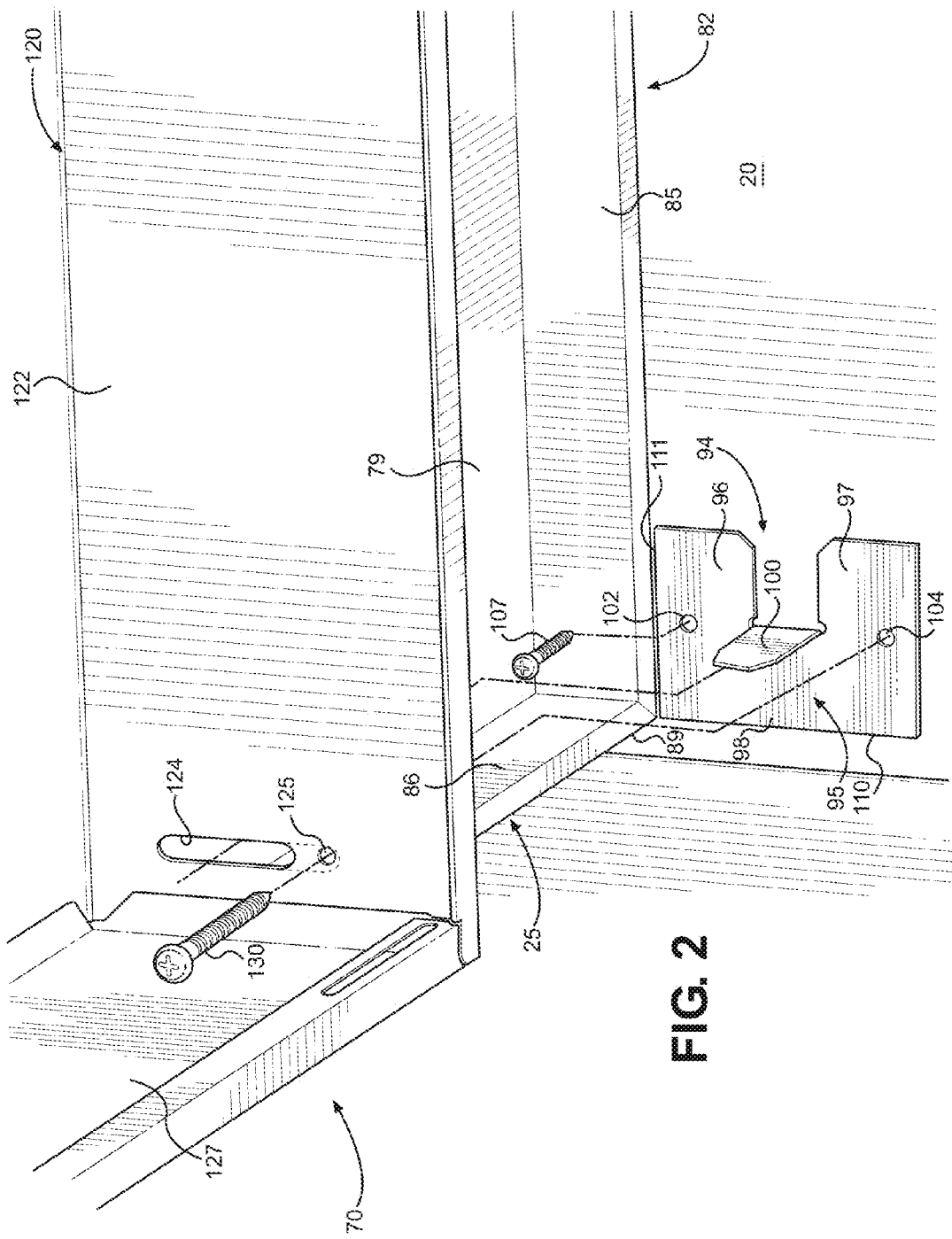
FIG. 2 is a partial exploded view of a first stage in the mounting of the ventilation hood of FIG. 1 in accordance with the invention.

In general, the operation of ventilation hood 70 is also known in the art. Therefore, apart from particular details set forth hereinafter, it should be recognized that the actual construction of ventilation hood 70 can vary from that depicted. Therefore, although ventilation hood 70 is shown to include a housing 72 and control knobs 74 and 75 for a fan and light (not shown) respectively, the invention is equally applicable to a wide range of other configurations. In connection with the mounting of ventilation hood 70, it should also be recognized that central cabinet 25 is also of known construction. That is, although the exact materials and construction can vary, central cabinet 25, as shown in FIG. 2, will almost invariably include a bottom panel or floor 79 and a lower support frame 82, shown to include a rear flange piece 85 and a side flange piece 86 which defines an outermost side edge portion 89 of central cabinet 25. Of course, corresponding structure exists on the opposing side (not shown in this figure) of cabinet 25.

In accordance with one aspect of the invention, support brackets are initially mounted at spaced locations beneath central cabinet 25. More particularly, for the left side of cabinet 25 as shown in FIG. 2, a support bracket 94 is shown to include a C-shaped base 95 having an upper portion 96, a lower portion 97 and a connecting portion 98. In the embodiment shown, support bracket 94 is made of sheet metal which is stamped to create a thin projection or tab 100. Base 95 is shown provided with an upper hole 102 and a lower hole 104. In connection with this invention, it is recognized that the outer lateral dimension of lower support frame 82 is standard based on the distance between wall cabinets 22 and 23. That is, the thicknesses of flange pieces 85 and 86 are recognized to vary, but the outermost dimension for lower support frame 82 can be readily determined based on the known spacing in which ventilation hood 70 is to be mounted.

With this information in hand, the first step in connection with the mounting method for ventilation hood 70 is to mount the support brackets 94 at predetermined positions based only on the construction of lower support frame 82. More specifically, in the embodiment shown, a first mechanical fastener 107 is positioned at upper hole 102 to mount support bracket 94 to rear wall 20 upon aligning a side edge 110 of bracket 94 with outermost edge portion 89 of side flange piece 86 and with upper edge 111 of bracket 94 extending directly along rear flange piece 85. Again, a similar mounting is done on the other lower side of cabinet 25.

As shown in this figure, ventilation hood 70 has a rear portion 120 established by a rear panel 122 which is formed with a slot 124 and a hole 125. Actually, although hole 125 is shown spaced below and generally aligned with slot 124, slot 124 could also be further elongated (shown in dotted) for a corresponding purpose as will become fully evident below. As illustrated, rear panel 122 is attached to a side panel 127 of the housing 72 of ventilation hood 70. Of particular note is the fact that rear panel 122 actually has corresponding structure at an opposing end portion (not shown in this figure) of rear panel 122 and the lateral spacing between the slots 124 is preset based on the known mounting positions for support brackets 94. More specifically, each slot 124 is positioned such that rear portion 120 can be readily supported by the mounted brackets 94 with each projection 100 extending through a respective slot 124. Therefore, at this early mounting stage, after the two spaced support brackets 94 are secured, ventilation hood 70 can be basically hung on support brackets 94 and easily supported by a single installer. The next step then concerns the manner in which a front portion of ventilation hood 70 is mounted. However, before detailing various embodiments to carry out this aspect of the invention with reference to the remaining figures, it should be realized that FIG. 2 illustrates the inclusion of a second mechanical fastener 130 for each support bracket 94. Overall, second mechanical fastener 130 is designed to be received in lower hole 104 to further secure a respective support bracket 94. However, at this time, it should be recognized that second mechanical fastener 130 can be selectively received directly in lower hole 104 or first through opening 125 (or a further elongated slot 124) in rear panel 122. In the former scenario, second mechanical fastener 130 is secured prior to supporting ventilation hood 70 on brackets 94 and, in the latter case, second mechanical fastener 130 is preferably secured after mounting the front portion of ventilation hood 70 as will now be described in detail.

Figure 3:
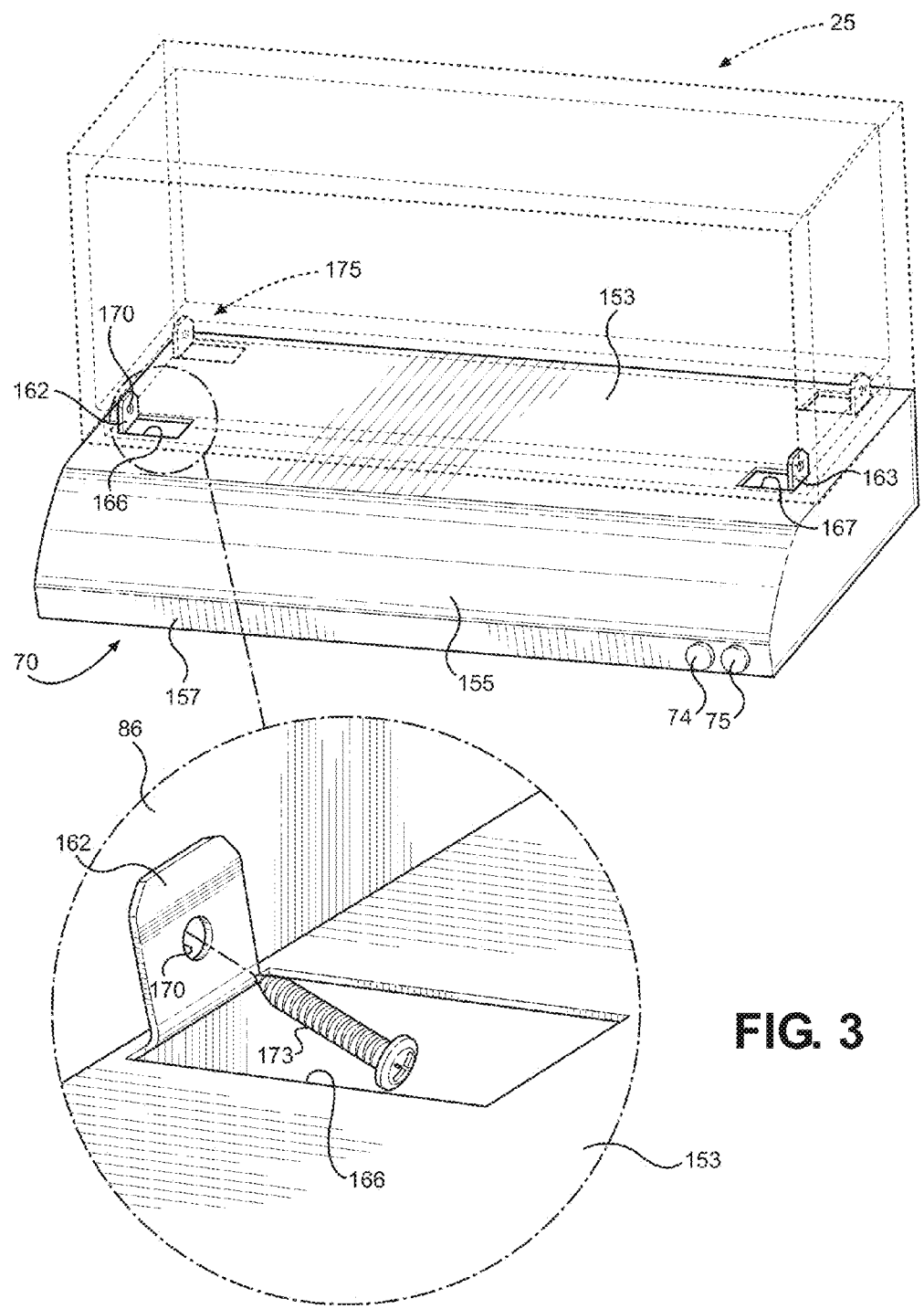
FIG. 3 is a perspective view of a first mounting embodiment.

FIG. 3 presents a first embodiment wherein the representative ventilation hood 70 is shown to include a top panel 153 which leads to a sloping section 155 and a front panel 157 to which control knobs 74 and 75 are mounted. In this exemplary arrangement, top panel 153, sloping section 155 and front panel 157 are created by bending and shaping a piece of sheet metal. In any case, out of top panel 153 is created flexible tabs 162 and 163. More specifically, top panel 153 is formed with enlarged openings 166 and 167 which are partially created by the formation of tabs 162 and 163 that have been bent so as to stand upright relative to top panel 153. Each tab 162, 163 is provided with a through hole 170 which is adapted to receive a mechanical fastener 173. In particular, each tab 162, 163 is bent so as to be positioned against a portion of lower support frame 82 of cabinet 25, such as side flange piece 86 as shown in this figure, and then mechanical fastener 173, such as a wood screw, can be arranged at an angle, such as 45°, so as to extend through hole 170 and fastened into side flange piece 86. That is, with the rear portion of ventilation hood 70 supported by brackets 94, the front portion of ventilation hood 70 can be tilted upward by the installer such that top panel 153 abuts the underside of cabinet 25, at which point each mechanical fastener 173 can be positioned through a respective enlarged opening 166, 167 to fixedly mount a corresponding tab 162, 163. To complete the mounting process, second mechanical fastener 130 (FIG. 2) can be mounted through aligned holes 125 and 104 (see FIG. 2). On the other hand, additional rear flexible tabs, such as that indicated at 175, could also be employed.

Figure 4A:
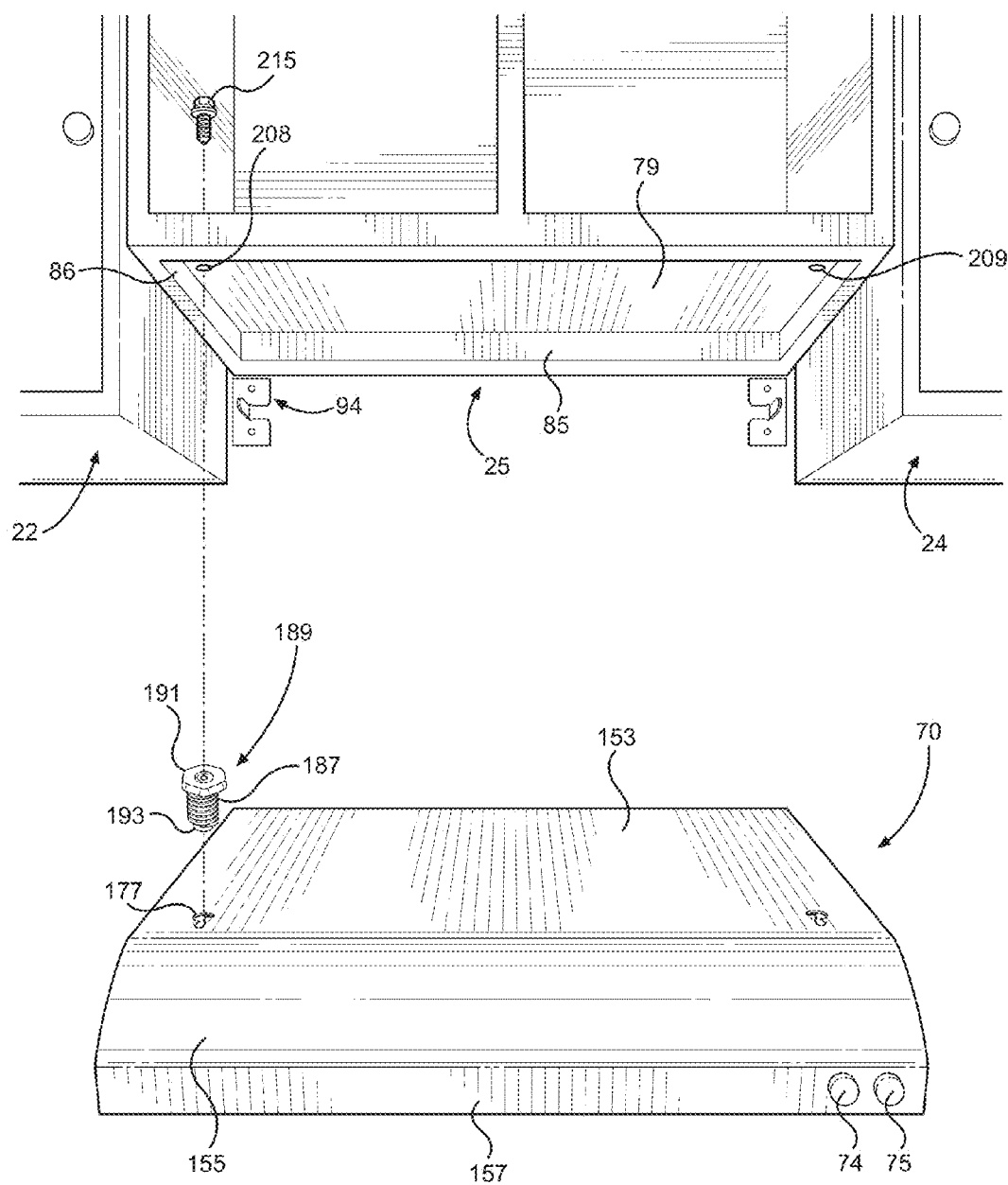
FIG. 4A is an exploded view illustrating an initial stage associated with a second mounting embodiment.
Figure 4B:
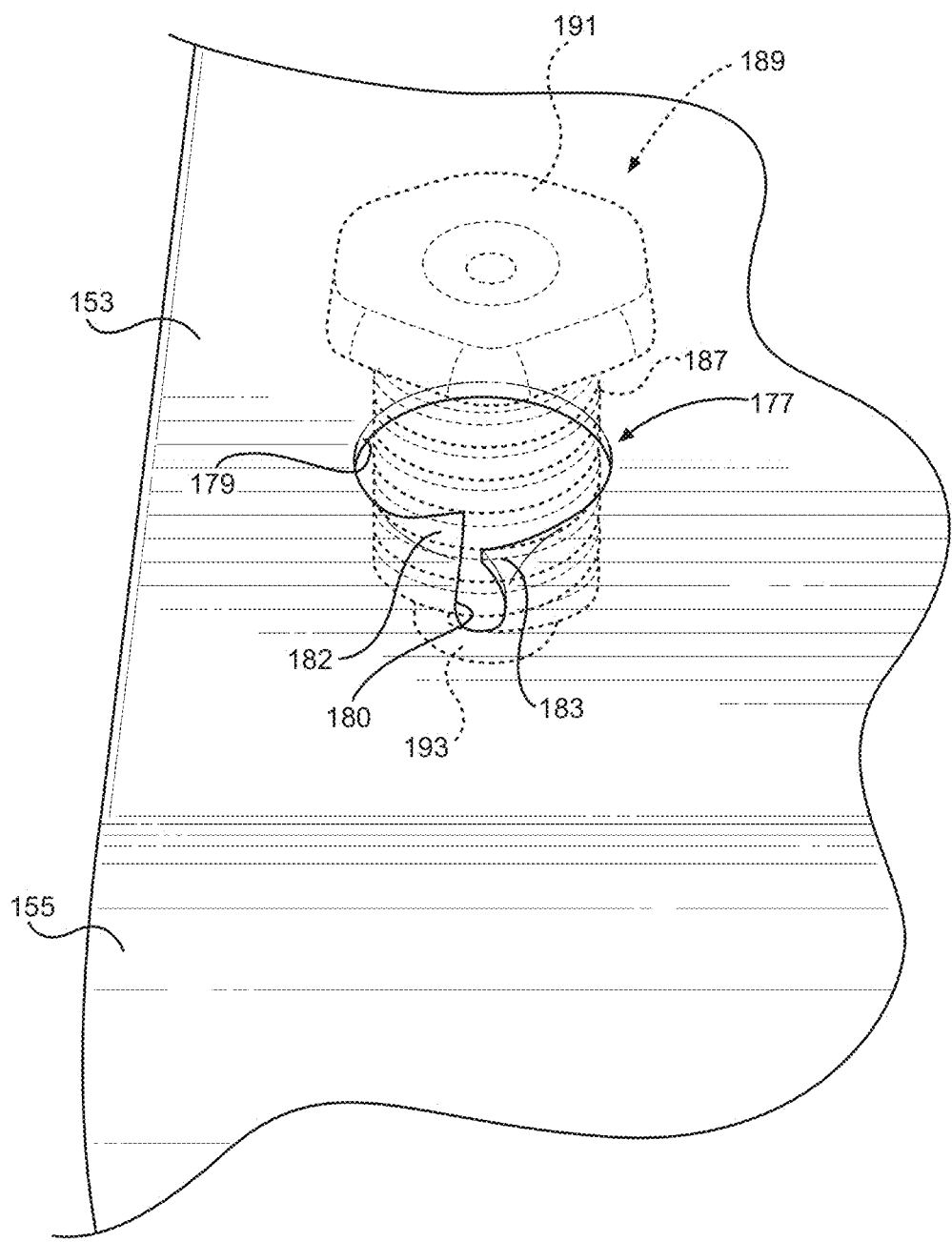
FIG. 4B shows a subsequent stage of the mounting embodiment of FIG. 4A.

FIGS. 4A-4E illustrate another mounting arrangement for the front portion of ventilation hood 70. In accordance with this embodiment, a frontal portion of top panel 153 of ventilation hood 70 is pre-formed with lateral spaced through holes 177. As best shown in FIGS. 4A and 4B, each hole 177 is defined by a large opening 179 leading to an extension opening 180 about which top panel 153 includes a raised section 182 adjacent a lowered section 183. This construction readily enables a threaded body portion 187 of a foot member 189 to be threadably attached to top panel 153. In the embodiment shown, each foot member 189 also includes a head 191 and a lower portion 193.

Figure 4C:
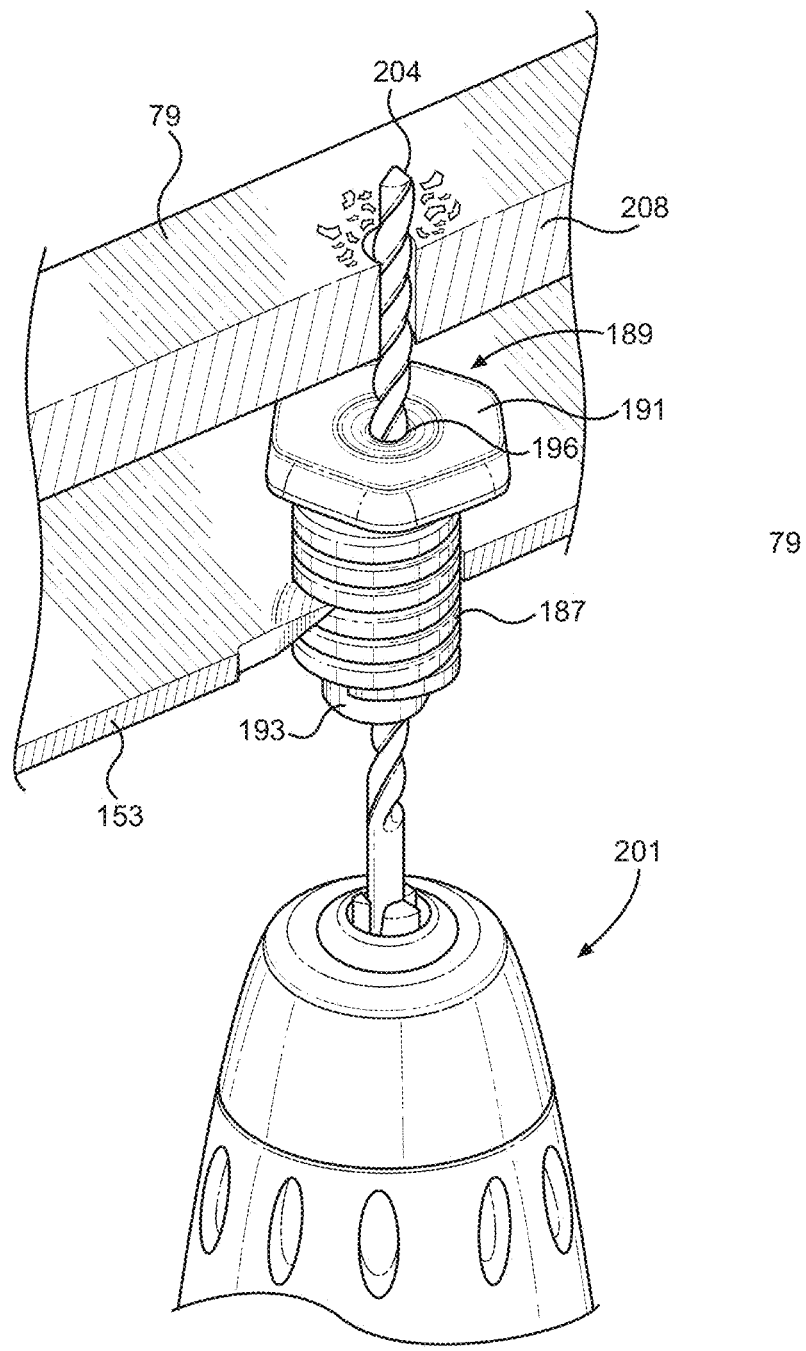
FIG. 4C illustrates another stage for the second mounting embodiment.
Figure 4D:
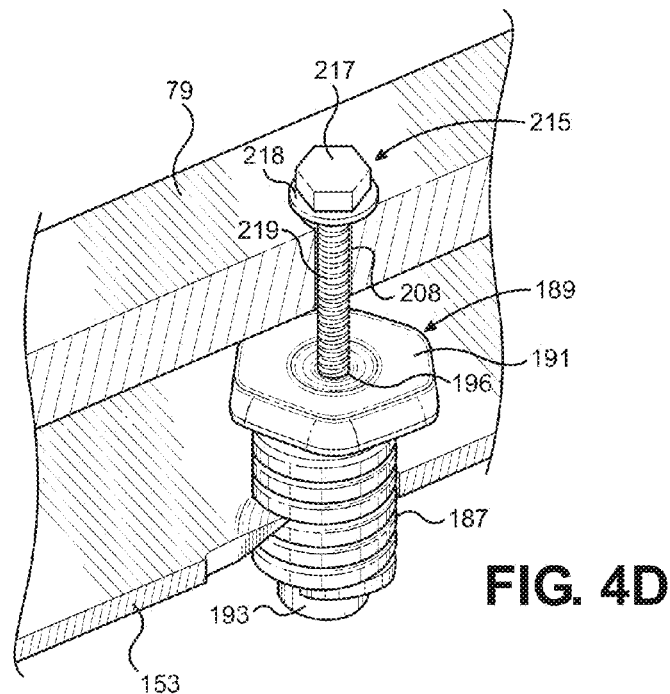
FIG. 4D depicts a still further stage of this embodiment.
Figure 4E:
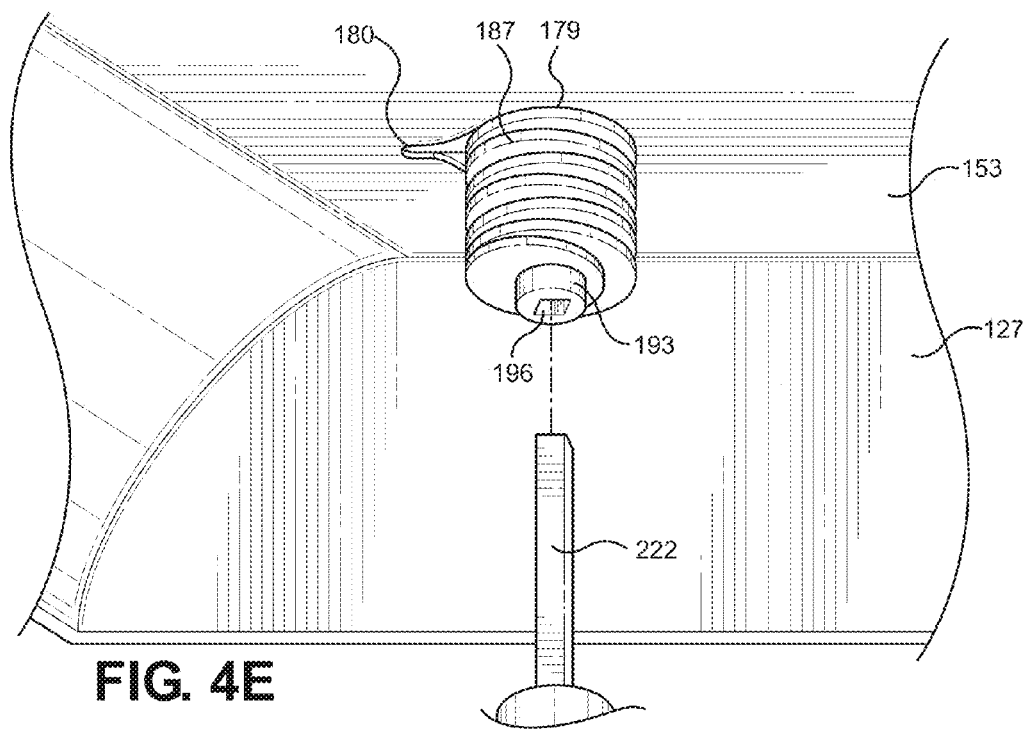
FIG. 4E illustrates s a final stage of this embodiment.

Extending through each of lower portion 193, threaded body portion 187 and head 191 is a bore 196 (particularly see FIGS. 4C-4E). With this arrangement, feet members 189 can be initially, partially threaded onto top panel 153 at the large openings 179. Then, upon mounting the rear portion of ventilation hood 70 on support brackets 94 and tilting of the front portion until ventilation hood 70 is positioned against the underside of cabinet 25, a drill 201 (see FIG. 4C) having a bit 204 can be used to form holes 208 and 209 in bottom panel 79 of cabinet 25. That is, with ventilation hood 70 in a desired mounting position, bit 204 is directed through bore 196, which acts as a guide for the drilling operation, in order to establish holes 208 and 209.

At this point, two main assembly avenues can be followed. In accordance with one avenue, ventilation hood 70 can be taken off of support brackets 94 to enable the installer to secure each foot member 189 to bottom panel 79 with a mechanical fastener 215. As perhaps best represented in FIG. 4D, mechanical fastener 215, shown to include a head 217, a washer 218 and a shank 219, is positioned in hole 208 and threaded into foot member 189. This operation is performed for each foot member 189. In each case, both head 217 of mechanical fastener 215 and head 191 of foot member 189 are shaped to receive tools, such as a wrench, to enable feet members 189 to be drawn up to the underside of bottom panel 79 while enabling fastener 215 and a respective foot member 189 to still freely rotate in unison relative to cabinet 25. Thereafter, ventilation hood 70 is again supported on brackets 94 and tilted such that lower portions 193 of feet members 189 will register at openings 179. At this point, as best represented in FIG. 4E, a polygonal shaped tool 222 can be inserted into bore 196 to thread body portion 187 of each foot member 187 into a respective opening 179, thereby drawing top panel 153 firmly against cabinet 25.

In the alternative, feet members 189 can be initially threaded to top panel 153 to an extent which enables top panel 153 of ventilation hood 70 to abut the underside of cabinet 25 and then, after supporting ventilation hood 70 on brackets 94 and tilting the front end against cabinet 25, mechanical fastener 215 can be threaded into bore 196 while tool 222, or an installer's fingers, is used to prevent each foot member 189 from rotating. In either scenario, it should be recognized that the bores 196 not only establish a convenience and accurate guide for drilling of holes 208 and 209, but also enable mechanical fasteners 215 to be easily threaded therein. Most preferably, feet members 189 are formed of molded plastic. In addition, feet members 189 advantageously occupy the filler space between bottom panel 79 and top panel 153 to establish a very solid mounting arrangement which can still be readily performed by a single installer without the use of any paper template and filler strip measuring or cutting. At this point, it should be noted that tool 222 can take various forms in correspondence with the shape of bore 196. For instance, conventional hex keys could be utilized. Also, an outer surface of lower portion 193 could actually be configured to receive a tool instead of shaping bore 196.

Figure 5:
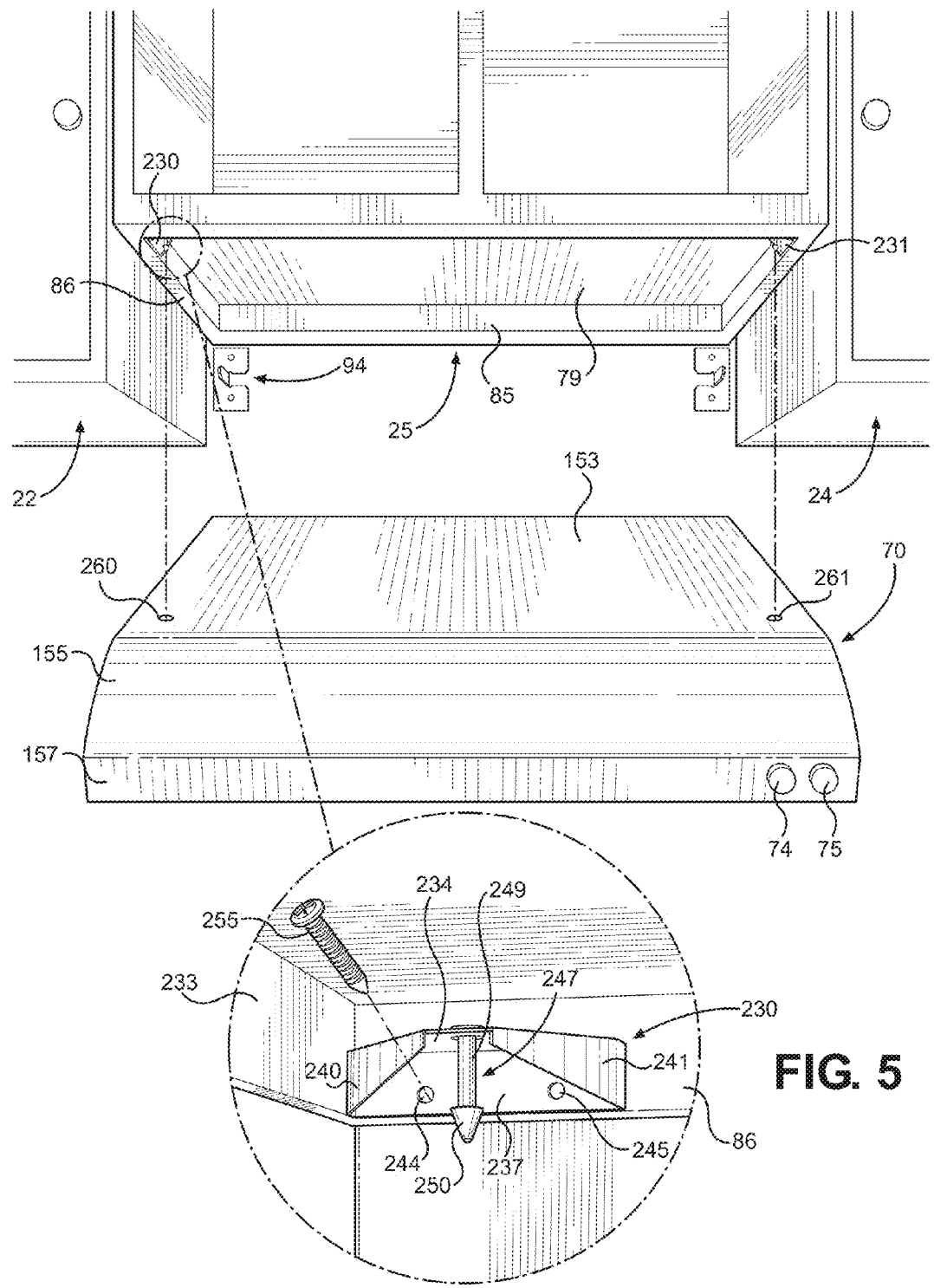
FIG. 5 presents an exploded view for a third embodiment.

As indicated above, the disclosed mounting system takes advantage of the fact that the lateral distance spanning the outermost edge portions 89 of the lower support frame 82 is standard for a given width cabinet 25 such that, with a corresponding ventilation hood 70, slots 124 can be pre-formed in rear panel 122 for accurate alignment with projections 100. In a related fashion, FIG. 5 sets forth an embodiment wherein the front portion of ventilation hood 70 is also supported based on securing mounting blocks 230 and 231 at predetermined frontal corner locations without the need for measurements or templates. More specifically, in the embodiment shown, each mounting block 230, 231 is designed to be mounted in abutment with both a respective side flange piece 86 and a front flange piece 233 of lower support frame 82 as will be described more fully below.

As depicted, each mounting block 230, 231 includes an upper plate 234, a back plate 237 and side plates 240 and 241. In one embodiment, mounting blocks 230 and 231 are formed of metal, but could also be formed of other materials, including plastic. In back plate 237, holes 244 and 245 are formed. In addition, projecting downward from and fixedly secured, such through a threaded connection, a welded connection or the like, to upper plate 234 is a connector 247 which is shown to include a shaft 249 and a conical tip 250. Each mounting block 230, 231 is configured to be mounted along a respective side flange piece 86, through mechanical fasteners one of which is shown at 255, while abutting front flange piece 233. The configuration of mounting block 230, 231 is predetermined such that shaft 249 will align with a respective through hole 260, 261 which is pre-formed in top panel 153 of ventilation hood 70. In accordance with this embodiment, once both support brackets 94 and mounting blocks 230 and 231 are secured in place, the rear portion of ventilation hood 70 can be easily supported on brackets 94 and then the front portion can be tilted upward toward the lower support frame 82 such that conical tips 250, which are preferably formed from an elastomeric material, extend into holes 260 and 261 such that connectors 247 are snap-connected to ventilation hood 70. Therefore, at least in situations where the interior lateral dimensions of lower support frame 82 are known, the positioning of holes 260 and 261 and the construction of mounting blocks 230 and 231 can be predetermined to enable mounting of ventilation hood 70 in a quick and easy fashion by a single installer.

Related to the embodiment of FIGS. 4A-4E, FIGS. 6-9 set forth other ways in which ventilation hood 70 can be secured directly from bottom panel 79 of cabinet 25. In each of these embodiments, it should be recognized that top panel 153 of ventilation hood 70 is pre-formed at spaced frontal locations with holes 260 and 261 in a manner corresponding to that referenced above in relation to the embodiment of FIG. 5. In any case, in connection with each of these additional embodiments, holes 265 and 266 must be established in bottom panel 79 of cabinet 25 in alignment with through holes 260 and 261 and then some fastener structure must extend through the aligned holes to complete assembly.

Figure 6:
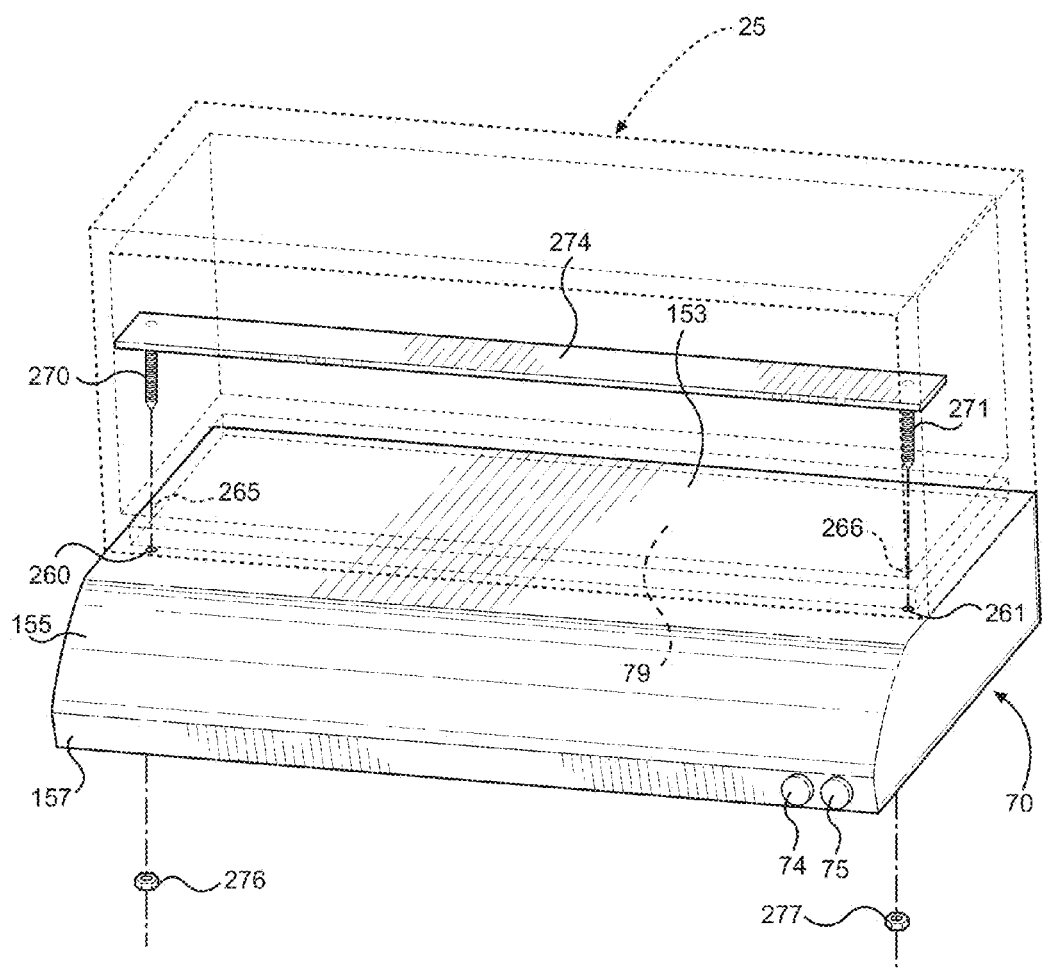
FIG. 6 sets forth a partial exploded view of a fourth mounting embodiment.

In the embodiment represented in FIG. 6, first and second mechanical fasteners 270 and 271 are provided, taking the form of threaded bolts which are interconnected by a plate 274. At this point, it should be realized that, given the existence of holes 260 and 261, ventilation hood 70 can be initially supported on brackets 94 and against the underside of cabinet 25 to enable holes 260 and 261 to act as guides for the formation (e.g., drilling) of holes 265 and 266 in bottom panel 79. However, plate 274 can also be specifically configured based on the known locations of holes 260 and 261 such that, upon placement either within or beneath cabinet 25 and providing mechanical fasteners 270 and 271 with pointed tips (not separately labeled), the pointed tips of mechanical fasteners 270 and 271 can be used to accurately mark locations for drilling holes 265 and 266. In any case, after holes 265 and 266 are formed, mechanical fasteners 270 and 271 can be inserted into holes 265 and 266 respectively, with plate 274 being positioned against bottom panel 79 within cabinet 25. Thereafter, ventilation hood 70 is supported upon brackets 94 and tilted so that mechanical fasteners 270 and 271 also extend through holes 260 and 261, whereupon nuts 276 and 277 are threaded to fasteners 270 and 271 to complete the mounting.

A modified embodiment which is not depicted in the drawings basically represents a configuration based on the embodiments of both FIGS. 4A-4E and FIG. 6 by employing mechanical fasteners which extend through holes 265 and 266 and then are threaded into holes, analogous to holes 179, provided in top panel 153 of ventilation hood 70. That is, instead of extending freely through holes 260 and 261 as in the embodiment of FIG. 6, the mechanical fasteners are threaded to the ventilation hood 70, much like as in the embodiment of FIGS. 4A-4E. In addition, much like the FIG. 6 embodiment, nuts can be employed, with the nuts assuring a secure and long-lasting attachment.

Figure 7A:
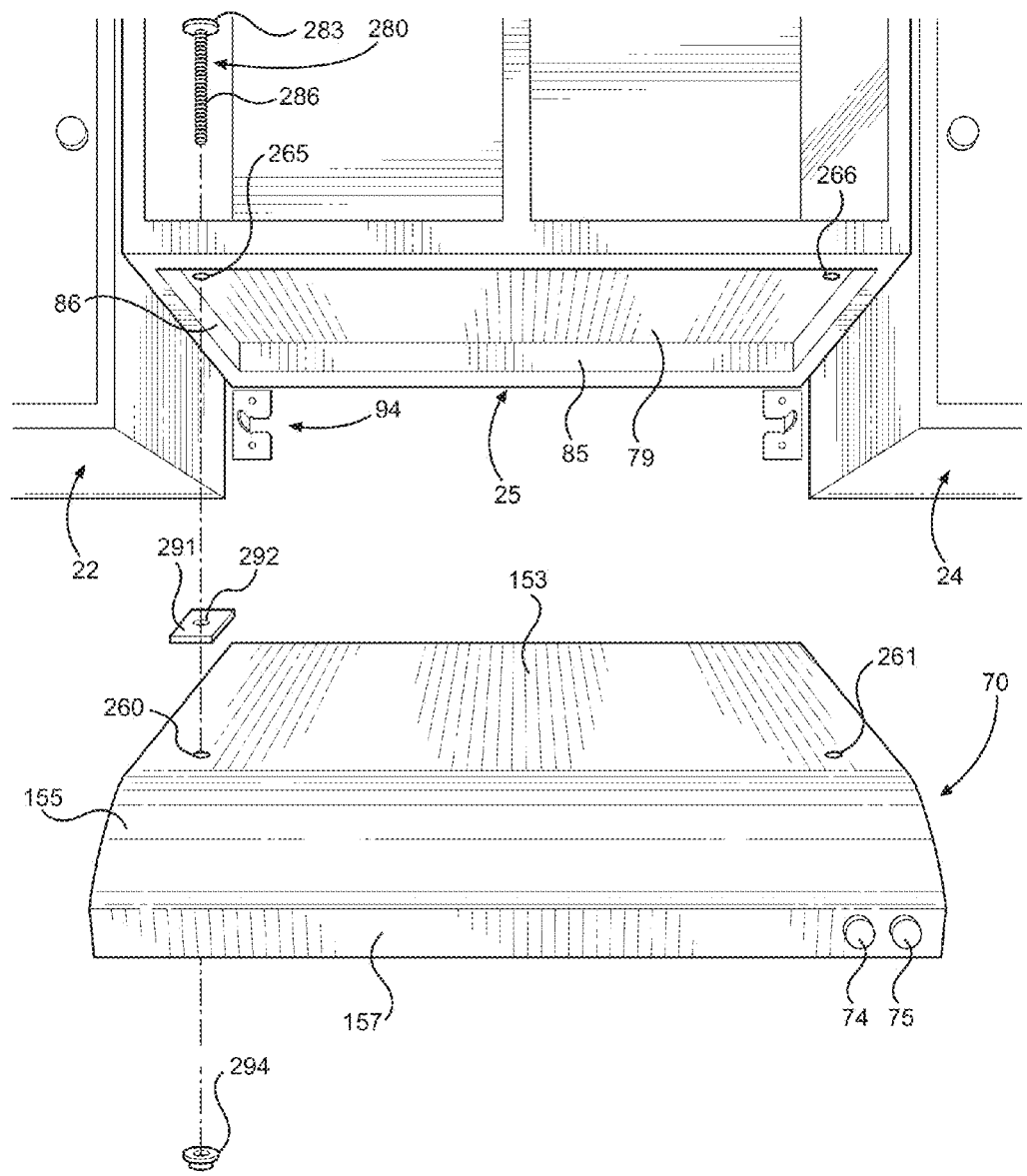
FIG. 7A sets forth a partial exploded view of a fifth mounting embodiment.
Figure 7B:
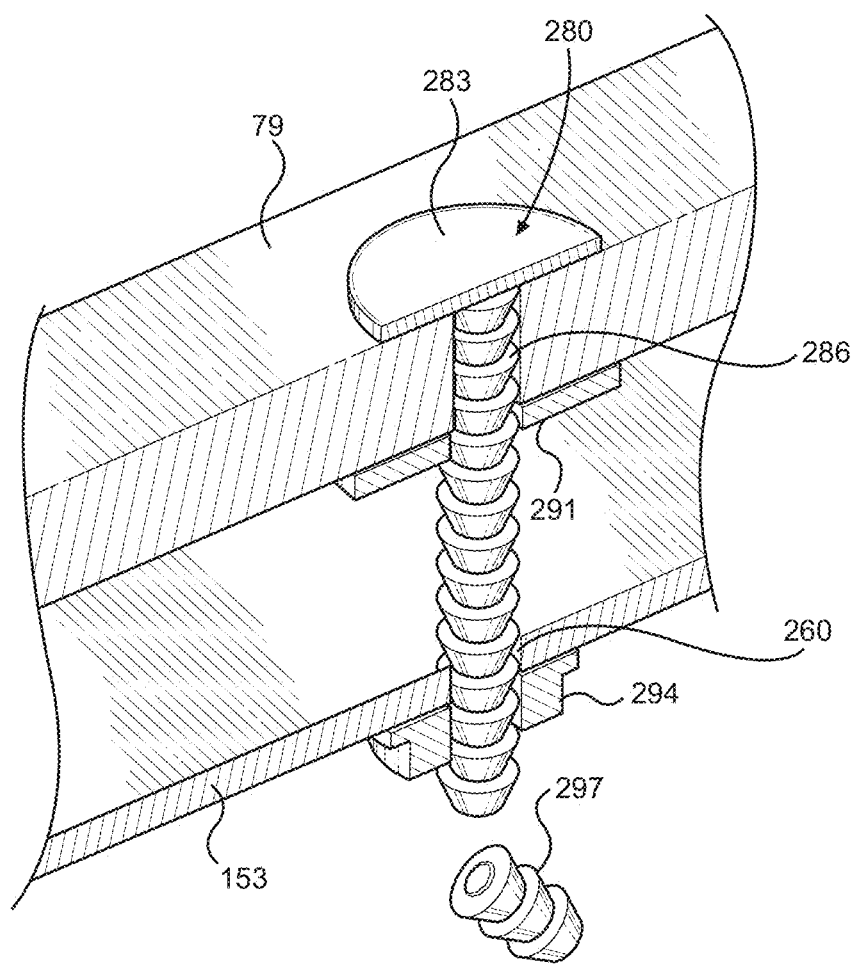
FIG. 7B is an enlarged view of a connector arrangement for the embodiment of FIG. 7A.

FIGS. 7A and 7B set forth an embodiment wherein, instead of using mechanical fasteners 270 and 271 in the form of threaded bolts, zip strips 280 are utilized to secure the front portion of ventilation hood 70 to cabinet 25. As shown in these figures, each zip strip 280 includes a head portion 283 and an elongated body portion 286. This overall assembly is also depicted to include an optional retainer element 291, provided with an aperture 292, and a fastener element 294. In accordance with this embodiment, each zip strip 280 is arranged such that elongated body portion 286 is initially inserted through a respective hole 265, 266 and then snugly into aperture 292 of retainer element 291. While pulling on elongated body portion 286 to retain head portion 283 against bottom panel 79, optional retainer element 291 can be pushed up so as to abut bottom panel 79 beneath cabinet 25. In this fashion, each zip strip 280 will be retained in a desired position with the elongated body portion 286 of each zip strip 280 dangling below cabinet 25. At this point, it should be noted that the optional retainer element 291 can take various forms, such as a plastic element which ratchets along body portion 286, a foam or other material forming block which could have a thickness which spans the filler space established by lower support frame 82, a clip, a clasp or another similar type of retainer element. In any case, once zip strips 280 are mounted, ventilation hood 70 can be supported on brackets 94 and tilted to enable elongated body portions 286 to project through holes 260 and 261. Thereafter, fastener elements 294 are placed on each elongated body portion 286 and, while placing the elongated body portion 286 in tension by pulling thereon, ratcheted upward until abutting top panel 153 while top panel 153 engages cabinet 25. Finally, to complete the assembly, the excess of each elongated body portion 286 can be snipped or otherwise removed as indicated in FIG. 7B at 297.

Figure 8:
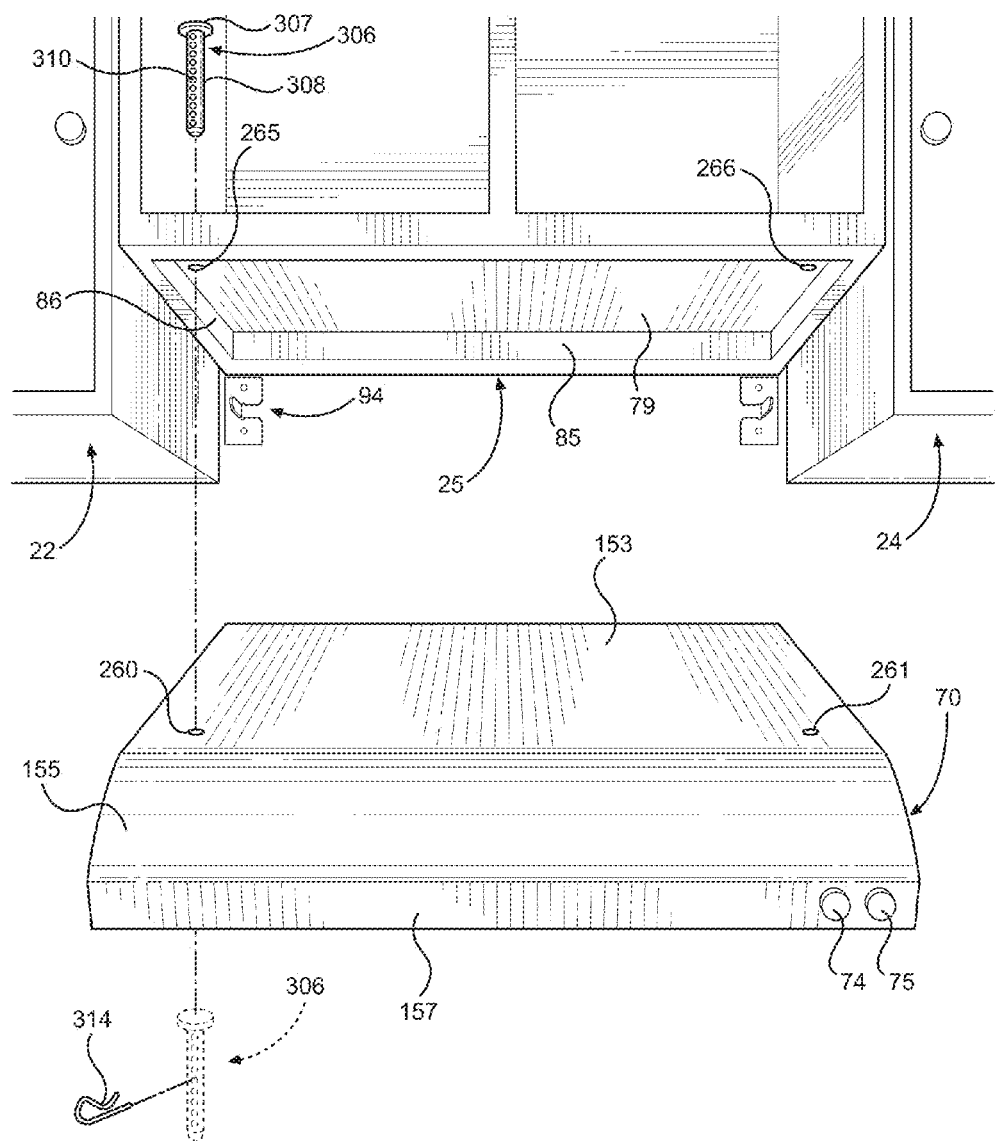
FIG. 8 sets forth a partial exploded view of a sixth mounting embodiment.
Figure 9:
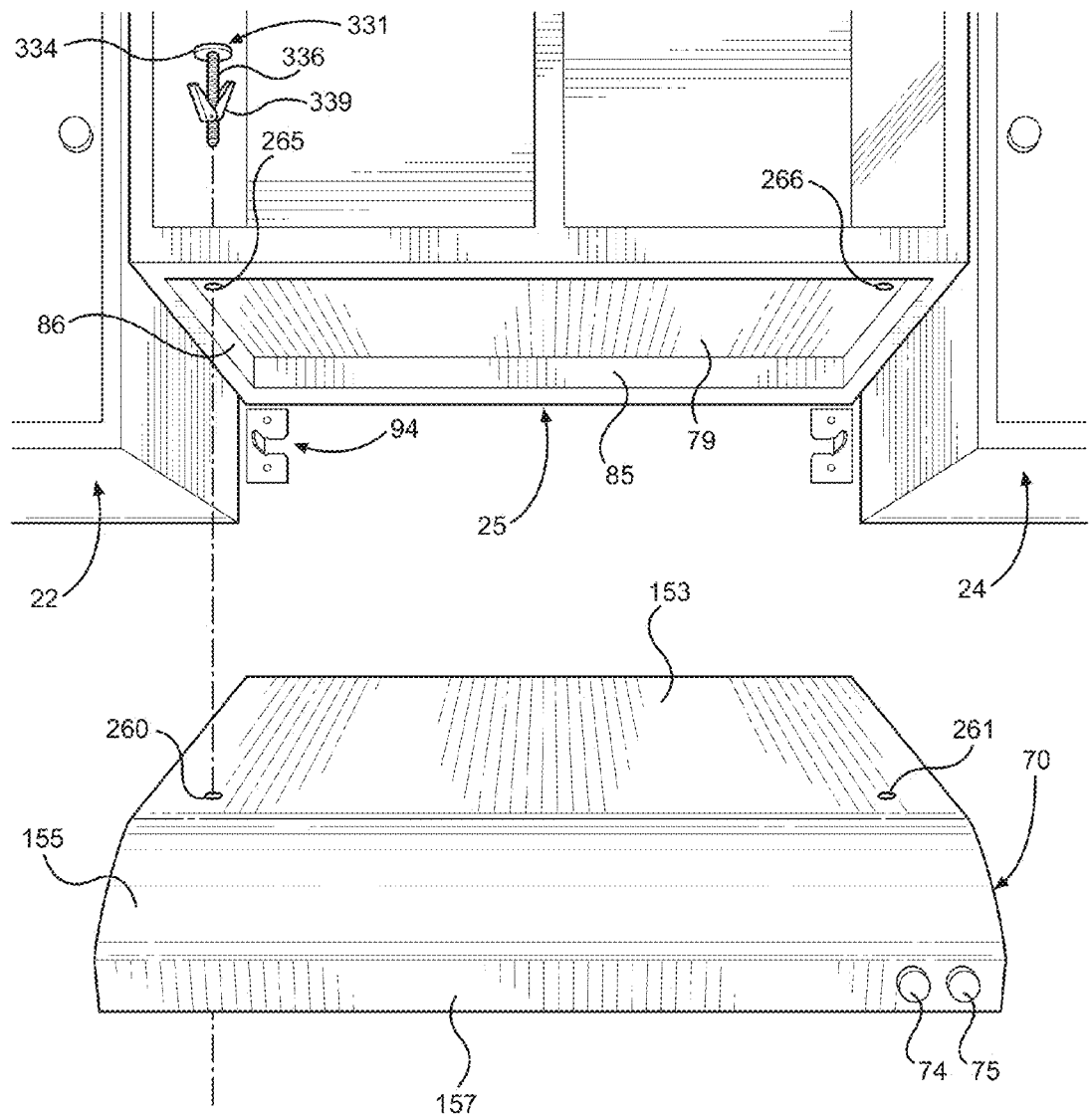
FIG. 9 sets forth a partial exploded view of a seventh mounting embodiment.

Again, as indicated above, once aligned holes 260 and 265, as well as aligned holes 261 and 266, are established, various different types of fastener assemblies can be utilized in connection with securing the front portion of ventilation hood 70. Two additional potential arrangements of this type are represented in the embodiments of FIGS. 8 and 9. In accordance with the embodiment of FIG. 8, bolts 306 having heads 307 and shafts 308 with a plurality of axial spaced and transverse holes 310 are employed. Here, each bolt 306 extends through a respective set of holes 265 and 260 or 266 and 261 in bottom panel 79 and top panel 153, and then a pin 314 is inserted thorough a selected transverse hole 310 to secure the ventilation hood 70 against cabinet 25. In the alternative arrangement of FIG. 9, a toggle bolt 313, having a head 334, a threaded shaft 336 and a nut with pivoting wings 339, is employed for a corresponding purpose.

Although described with respect to preferred embodiments of the invention, it should be readily apparent that various changes and/or modifications can be made to the invention without departing from the spirit thereof. For instance, although the discussed embodiments refer to separate first and second support brackets, as well as first and second fastener assemblies, it should be noted that the invention can be carried out with the first and second support brackets interconnected into an integral member, as well as actually employing one or more fastener assemblies. In addition, based on the above, it should be readily apparent that the invention can employ various different fastener assemblies in connection with an overall system and method for mounting a ventilation hood to an underside of a cabinet, including a bottom panel and a lower support frame, positioned above a cooking appliance. Each embodiment employs the initial mounting of brackets, either separately or an integral member, below the cabinet, against the wall and aligned with outermost edge portions of the lower support frame, with each bracket including some type of projection for engaging and supporting a rear portion of the ventilation hood. In connection with this aspect of the invention, it should be realized that each bracket could be provided with an additional flange to permit an attachment directly to the cabinet support frame, while the bracket is still positioned against the wall. This mounting arrangement could be particularly advantageous when the alternative is mounting the bracket only to drywall mounting between adjacent wall studs. Furthermore, each embodiment employs one or more fastener assemblies attaching a front portion of the ventilation hood to the cabinet. Each of the embodiments is designed to assure that the ventilation hood can be mounted in an easy and efficient manner by a single person, without the need for measuring, cutting and installing filler strips as common in the art.

We claim:

1. A system comprising: a ventilation hood; a cabinet including a bottom panel and a lower support frame positioned above a cooking appliance; first and second brackets mounted below, and not attached to, the cabinet at spaced positions aligned with outermost edge portions of the lower support frame, each of said first and second brackets including a projection, each projection engaging and supporting a rear portion of the ventilation hood; and at least one fastener assembly attaching a front portion of the ventilation hood to the cabinet.

2. The system according to claim 1, wherein the first and second brackets are fixedly secured to a wall, against which the cabinet is mounted, at positions directly below the cabinet and aligned with the outermost edge portions of the lower support frame.

3. The system according to claim 1, wherein the ventilation hood includes a housing from which are bent spaced flexible tabs which form part of the at least one fastener assembly, each of the flexible tabs being secured directly to the lower support frame of the cabinet.

4. The system according to claim 3, wherein the housing of the ventilation hood includes enlarged openings formed, at least in part, upon bending the flexible tabs, said at least one fastener assembly being further formed by threaded fasteners securing the flexible tabs to the lower support frame, with the enlarged openings providing access to the flexible tabs through the housing.

5. The system according to claim 1, wherein the at least one fastener assembly includes a pair of feet members adjustably attached to and projecting up from the ventilation hood and mechanical fasteners extending through the bottom panel of the cabinet and into the feet members.

6. The system according to claim 5, wherein each of the feet members includes a threaded body portion having a bore extending entirely there through.

7. The system according to claim 6, wherein each of the feet members also includes an upper portion, having a head configured to receive a tool, and a lower portion, and wherein the bore at the lower portion is polygonal in shape.

8. The system according to claim 1, wherein the at least one fastener assembly includes mounting blocks, from which first and second connectors extend, the mounting blocks being secured at frontal corner portions of the lower support frame with the first and second connectors projecting downward from the mounting blocks and being attached to the ventilation hood.

9. The system according to claim 8, wherein the first and second connectors are snap-connected to the ventilation hood.

10. The system according to claim 1, wherein the at least one fastener assembly includes first and second mechanical fasteners interconnected by a plate, each of the first and second mechanical fasteners extending through both the bottom panel and the ventilation hood, while the plate is positioned against the bottom panel.

11. The system according to claim 1, wherein the at least one fastener assembly includes zip strips, with each zip strip including a head portion positioned against the bottom panel, an elongated body portion extending through both the bottom panel and the ventilation hood, and a fastener element ratcheted onto the elongated body portion.

12. The system according to claim 1, wherein the at least one fastener assembly includes bolts extending through both the bottom panel of the cabinet and the ventilation hood.

13. The system according to claim 12, wherein the at least one fastener assembly further includes pins extending through transverse holes in the bolts.

14. A system comprising: a ventilation hood; a cabinet including a bottom panel and a lower support frame positioned above a cooking appliance; first and second brackets mounted against a wall underneath the cabinet at spaced positions aligned with outermost edge portions of the lower support frame, each of said first and second brackets including a projection, each projection engaging and supporting a rear portion of the ventilation hood; and at least one fastener assembly attaching a front portion of the ventilation hood to the cabinet.

15. The system according to claim 14, wherein the first and second brackets are fixedly secured to the wall, against which the cabinet is mounted, at positions directly below the cabinet and aligned with the outermost edge portions of the lower support frame.

16. The system according to claim 14, wherein the ventilation hood includes a housing from which are bent spaced flexible tabs which form part of the at least one fastener assembly, each of the flexible tabs being secured directly to the lower support frame of the cabinet.

17. The system according to claim 16, wherein the housing of the ventilation hood includes enlarged openings formed, at least in part, upon bending the flexible tabs, said at least one fastener assembly being further formed by threaded fasteners securing the flexible tabs to the lower support frame, with the enlarged openings providing access to the flexible tabs through the housing.

18. The system according to claim 14, wherein the at least one fastener assembly includes a pair of feet members adjustably attached to and projecting up from the ventilation hood and mechanical fasteners extending through the bottom panel of the cabinet and into the feet members.

19. The system according to claim 18, wherein each of the feet members includes a threaded body portion having a bore extending entirely there through.

20. The system according to claim 19, wherein each of the feet members also includes an upper portion, having a head configured to receive a tool, and a lower portion, and wherein the bore at the lower portion is polygonal in shape.

21. The system according to claim 14, wherein the at least one fastener assembly includes mounting blocks, from which first and second connectors extend, the mounting blocks being secured at frontal corner portions of the lower support frame with the first and second connectors projecting downward from the mounting blocks and being attached to the ventilation hood.

22. The system according to claim 21, wherein the first and second connectors are snap-connected to the ventilation hood.

23. The system according to claim 14, wherein the at least one fastener assembly includes first and second mechanical fasteners interconnected by a plate, each of the first and second mechanical fasteners extending through both the bottom panel and the ventilation hood, while the plate is positioned against the bottom panel.

24. The system according to claim 14, wherein the at least one fastener assembly includes zip strips, with each zip strip including a head portion positioned against the bottom panel, an elongated body portion extending through both the bottom panel and the ventilation hood, and a fastener element ratcheted onto the elongated body portion.

25. The system according to claim 14, wherein the at least one fastener assembly includes bolts extending through both the bottom panel of the cabinet and the ventilation hood.

26. The system according to claim 25, wherein the at least one fastener assembly further includes pins extending through transverse holes in the bolts.

* * * * *